US009560862B2

(12) United States Patent
Yamamoto et al.

(10) Patent No.: US 9,560,862 B2
(45) Date of Patent: Feb. 7, 2017

(54) PROCESS FOR PRODUCING MATERIAL FOR FOOD OR BEVERAGE

(71) Applicant: AJINOMOTO CO., INC., Tokyo (JP)

(72) Inventors: Hideki Yamamoto, Kawasaki (JP); Yukiko Takakura, Kawasaki (JP); Makoto Yamada, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 0 days.

(21) Appl. No.: 14/497,590

(22) Filed: Sep. 26, 2014

(65) Prior Publication Data

US 2015/0010689 A1   Jan. 8, 2015

Related U.S. Application Data

(63) Continuation of application No. PCT/JP2013/056067, filed on Mar. 6, 2013.

(30) Foreign Application Priority Data

Mar. 29, 2012   (JP) ................................ 2012-076219

(51) Int. Cl.
*A23L 2/00*  (2006.01)
*A23D 9/04*  (2006.01)
*A23D 9/00*  (2006.01)
*A23D 9/007*  (2006.01)
*A23L 2/56*  (2006.01)

(52) U.S. Cl.
CPC . *A23D 9/04* (2013.01); *A23D 9/00* (2013.01); *A23D 9/007* (2013.01); *A23L 2/56* (2013.01); *A23L 27/00* (2016.08); *A23V 2002/00* (2013.01)

(58) Field of Classification Search
None
See application file for complete search history.

(56) References Cited

U.S. PATENT DOCUMENTS

| 5,079,017 A * | 1/1992 | Chen ................... A23L 1/22607 |
| | | 426/312 |
| 5,178,892 A * | 1/1993 | Simmons ................ C11C 3/006 |
| | | 426/533 |
| 5,783,247 A | 7/1998 | Van Der Heijden et al. |
| 2012/0269947 A1 | 10/2012 | Osanai et al. |

FOREIGN PATENT DOCUMENTS

| EP | 0 356 799 A2 | 3/1990 |
| EP | 0 356 799 A3 | 3/1990 |
| EP | 0 463 660 A1 | 1/1992 |
| JP | 2-117345 A | 5/1990 |
| JP | 8-511691 A | 12/1996 |
| JP | 2704180 B2 | 1/1998 |
| JP | 3344522 B2 | 11/2002 |
| JP | 4596475 B2 | 12/2010 |
| WO | WO 2011/078376 A1 | 6/2011 |
| WO | WO 2012/020598 A1 | 2/2012 |

OTHER PUBLICATIONS http://web.archive.org/web/20130106210044/http://www.endmemo.com/cconvert/mgml.php.*
Choe: Mechanisms and Factors for Edible Oil Oxidation; Comprehensive Reviews in Food Science and Food Safety, vol. 5, Issue 4, pp. 169-186, Sep. 2006; Article first published online: Sep. 29, 2006; DOI: 10.1111/j.1541-4337.2006.00009.*
International Search Report issued May 14, 2013 in PCT/JP2013/056067.
Extended European Search Report issued Oct. 13, 2015 in Patent Application No. 13768617.6.

* cited by examiner

*Primary Examiner* — Patricia George
(74) *Attorney, Agent, or Firm* — Oblon, McClelland, Maier & Neustadt, L.L.P.

(57) ABSTRACT

Heating an oil from a plant or animal while supplying oxygen at a dissolved oxygen supply speed of not less than 0.058 mg/L/min to the oil from plant or animal is a convenient production method of a material for food or drink, which is capable of imparting an aroma and/or a flavor, which are/is mellow and rich in variety, to a food or drink.

23 Claims, No Drawings

PROCESS FOR PRODUCING MATERIAL FOR FOOD OR BEVERAGE

CROSS REFERENCES TO RELATED APPLICATIONS

This application is a continuation of International Patent Application No. PCT/JP2013/056067, filed on Mar. 6, 2013, and claims priority to Japanese Patent Application No. 2012-076219, filed on Mar. 29, 2012, both of which are incorporated herein by reference in their entireties.

BACKGROUND OF THE INVENTION

Field of the Invention

The present invention relates to methods of producing a material for a food or drink, which is used for imparting an aroma and/or a flavor to a food or drink, and particularly relates to methods of producing a material for food or drink, which is used for imparting a food or drink with an aroma and/or a flavor, which are/is mellow and rich in variety.

Discussion of the Background

As a production method of a material for food or drink, which is used for imparting an aroma and/or a flavor to a food or drink, a method of producing a material for food or drink, which contains saturated or unsaturated aliphatic aldehyde or other oxidized product obtained by oxidizing fats and oils, has conventionally been used.

With regard to such production method, some propositions have heretofore been made to produce a material for food or drink, which is capable of imparting a more preferable aroma and/or flavor (see JP-B-3344522, JP-B-4596475, and JP-B-2704180, which are incorporated herein by reference in their entireties).

JP-B-3344522 describes a production method of a flavor imparting agent including a step of heating a mixture of an oil from plant or animal and water while blowing-in oxygen. However, since heating is performed under mild conditions in the presence of water in this method, the method is complicated and shows poor production efficiency. Moreover, since the resultant product is limited, the obtained flavor imparting agent provides a monotonous aroma and flavor, and fails to impart an aroma and/or a flavor, which are/is mellow and rich in variety.

JP-B-4596475 describes a production method of a taste improving agent, which includes a step of oxidizing an oil from plant or animal, and removing low-boiling-point components. However, the method is complicated and fails to impart an aroma and/or a flavor, which are/is mellow and rich in variety, since the active ingredient of the obtained taste improving agent is limited to a high-boiling-point component.

JP-B-2704180 describes a production method of a flavor mixture, which includes a step of oxidizing fats and oils in the presence of an antioxidant. However, the method is complicated, and the obtained flavor mixture provides a monotonous aroma and flavor, since oxidation is performed while controlling the oxidation reaction of fats and oils with an antioxidant. Thus, the method fails to impart an aroma and/or a flavor, which are/is mellow and rich in variety.

SUMMARY OF THE INVENTION

Accordingly, it is one object of the present invention to provide novel convenient methods of producing a material for food or drink, which is capable of imparting an aroma and/or a flavor, which are/is mellow and rich in variety, to a food or drink.

This and other objects, which will become apparent during the following detailed description, have been achieved by the inventors' discovery that the reaction efficiency of an oxidation treatment including heating fats and oils while supplying oxygen is completely different depending on the manner of oxygen supply even when the amount of oxygen to be supplied to the fats and oils is the same. For example, in JP-B-4596475, oxygen gas or air is passed while stirring fats and oils. However, the method shows poor reaction efficiency. On the other hand, when the air was passed through a sparger with 10 to 1000 μm diameter to give microscopic bubbles and the bubbles were passed through fats and oils, an efficient reaction could be performed, wherein a smaller pore size of the sparger afforded a more efficient reaction.

The present inventors have conducted further studies based on such finding and took note of a concept of dissolved oxygen supply speed, which has not at all been considered heretofore in this field, and found that a dissolved oxygen supply speed varies between a method with poor reaction efficiency and a method with good reaction efficiency, namely, a method with poor reaction efficiency such as the one described in JP-B-4596475 shows a low dissolved oxygen supply speed and, conversely, a method with good reaction efficiency shows a very high dissolved oxygen supply speed.

Based on these findings, the present inventors have found that the reaction can be performed efficiently by heating fats and oils while supplying oxygen such that the dissolved oxygen supply speed will be not less than a particular speed, and a material for food or drink, which is capable of imparting an aroma and/or a flavor, which are/is mellow and rich in variety, to a food or drink, can be obtained irrespective of the kind of fats and oils, which resulted in the completion of the present invention.

Accordingly, the present invention provides:

(1) A method of producing a material for food or drink, which comprises a step of heating an oil from plant or animal while supplying oxygen at a dissolved oxygen supply speed of not less than 0.058 mg/L/min to the oil from plant or animal (hereinafter to be referred to as the heating step).

(2) The method of the aforementioned (1), wherein the dissolved oxygen supply speed in the aforementioned heating step is not less than 0.1 mg/L/min.

(3) The method of the aforementioned (1), wherein the dissolved oxygen supply speed in the aforementioned heating step is not less than 1.0 mg/L/min.

(4) The method of any one of the aforementioned (1)-(3), wherein the heating temperature in the aforementioned heating step is 50 to 200° C.

(5) The method of any one of the aforementioned (1)-(4), wherein the heating time in the aforementioned heating step is 2 to 24 hours.

(6) The method of any one of the aforementioned (1)-(5), wherein the aforementioned oil from plant or animal has a dissolved oxygen concentration of not less than 6.5 mg/L before being subjected to the aforementioned heating step.

(7) The method of any one of the aforementioned (1)-(6), wherein the aforementioned oil from plant or animal is animal fat or oil.

(8) A material for food or drink, which is obtained by the method of any one of the aforementioned (1)-(7).

(9) The material for food or drink of the aforementioned (8), comprising octanoic acid at 5 to 500 weight ppm, and decanoic acid at 10 to 4200 weight ppm.

(10) The material for food or drink of the aforementioned (9), further comprising 1-octen-3-ol at 5 to 550 weight ppm.

(11) The material for food or drink of the aforementioned (9) or (10), which satisfies $0 \leq A \leq 80$, $5 \leq B \leq 80$ and $10 \leq C \leq 90$, wherein A is a content in parts by weight of 1-octen-3-ol, B is a content in parts by weight of octanoic acid, and C is a content in parts by weight of decanoic acid, and A+B+C=100.

(12) A production method of a food or drink, comprising adding the material of any one of the aforementioned (8)-(11) to a food or drink to impart an aroma and/or a flavor to the food or drink.

According to the present invention, a convenient production method of a material for food or drink, which is capable of imparting an aroma and/or a flavor, which are/is mellow and rich in variety, to a food or drink, can be provided.

DETAILED DESCRIPTION OF THE PREFERRED EMBODIMENTS

In the present specification, the term "aroma" means an odor (orthonasal flavor) that can be felt by nose alone without eating or drinking. The term "flavor" means an odor (retronasal flavor) that passes from the oral cavity to nose during eating or drinking.

The term "oil from plant or animal" to be used in the production method of a material for food or drink of the present invention (hereinafter to be also simply referred to as "the method of the present invention") is a generic term of animal-derived fats and oils (animal fats and oils) and plant-derived fats and oils (plant fats and oils). Examples of the animal fats and oils include chicken fat, lard, beef fat, sheep oil, fish oil (e.g., tuna oil, bonito oil, sardine oil, mackerel oil, whale oil, salmon oil, codfish oil, etc.), butter, egg fat and the like, and examples of the plant fats and oils include rape seed oil, rice oil, safflower oil, sunflower oil, olive oil, peanuts oil, palm oil, coconut oil, soybean oil, corn oil, cottonseed oil, sesame oil, grape seed oil, perilla oil, and the like. Among these, animal fats and oils are preferable since they contain a large amount of unsaturated fatty acid and/or branched chain fatty acid, and chicken fat, lard, beef fat, and fish oil are particularly preferable. These oils from plant or animal may be used alone or two or more kinds thereof may be used in combination.

The method of the present invention includes a step of heating an oil from plant or animal while supplying oxygen to the oil from plant or animal (hereinafter to be also referred to as "the heating step").

In the method of the present invention, it is important to supply oxygen to an oil from plant or animal at a dissolved oxygen supply speed not less than a particular speed in the heating step. When the dissolved oxygen supply speed is not less than a particular speed, the obtained material for food or drink can impart an aroma and/or a flavor, which are/is mellow and rich in variety, to a food or drink.

As used herein, the term "dissolved oxygen supply speed" refers to variation in the dissolved oxygen concentration per unit time, which is calculated from the time of oxygen supply to an oil from plant or animal, and variation in the concentration of dissolved oxygen in the oil from plant or animal, and specifically calculated from the following formula.

dissolved oxygen supply speed=variation in concentration of dissolved oxygen in oil from plant or animal/time of oxygen supply to oil from plant or animal The dissolved oxygen supply speed in the method of the present invention is measured using fluorescence-type oxygen meter Model. FOM-1000 manufactured by Automatic System Research Co. Ltd. and according to the following (1)-(3). Since the dissolved oxygen concentration of fats and oils markedly decreases due to the heating reaction, the dissolved oxygen supply speed is measured at 25° C.

(1) A fluorescence-type oxygen meter is powered on, and allowed to stand for 10 minutes in the air for stabilization.

(2) Calibration is performed in the air.

(3) A sensor is inserted obliquely into a sample and fixed, the dissolved oxygen concentration is measured when the numerical value becomes stable, and the dissolved oxygen supply speed is calculated by the above-mentioned formula.

To be specific, the dissolved oxygen supply speed in the heating step is generally not less than 0.058 mg/L/min, preferably not less than 0.08 mg/L/min, more preferably not less than 0.1 mg/L/min, still more preferably not less than 0.5 mg/L/min, particularly preferably not less than 1.0 mg/L/min, most preferably not less than 1.5 mg/L/min. The unit mg/L/min refers to the mg of dissolved oxygen per liter of oil per minute. When the dissolved oxygen supply speed is less than 0.058 mg/L/min, the obtained material for food or drink tends to show a weak effect of imparting an aroma and/or a flavor, which are/is mellow and rich in variety, to a food or drink.

On the other hand, the upper limit of the dissolved oxygen supply speed in the heating step is not particularly limited. However, it is generally not more than 100 mg/L/min, preferably not more than 30 mg/L/min, more preferably not more than 10 mg/L/min, particularly preferably not more than 5 mg/L/min.

The method for supplying oxygen to an oil from plant or animal in the heating step is not particularly limited as long as it can supply oxygen at the aforementioned dissolved oxygen supply speed. Examples thereof include a method comprising passing a gas containing oxygen through a porous body (e.g., sparger etc.) having a pore size of 5 to 1000 μm at a flow of 0.1 to 10 L/min per 100 g of an oil from plant or animal to give microscopic bubbles and passing the bubbles through the oil from plant or animal; a method comprising passing a gas containing oxygen through a microbubble generator, a nanobubble generator and the like to give microscopic bubbles and passing the bubbles through the oil from plant or animal; a method comprising stirring a mixture of a gas containing oxygen and an oil from plant or animal by a high speed stirring emulsifier (e.g., homogenizer etc.) to give microscopic bubbles and passing the bubbles through the oil from plant or animal and the like.

Examples of the gas containing oxygen include pure oxygen, air, oxygen enriched air, a mixed gas of oxygen and an inert gas (e.g., carbon dioxide, nitrogen, helium, argon, etc.), ozone and the like, and air is preferable.

When oxygen is supplied to an oil from plant or animal by the "method comprising passing a gas containing oxygen through a porous body having a pore size of 5 to 1000 μm at a flow of 0.1 to 10 L/min per 100 g of an oil from plant or animal to give microscopic bubbles and passing the bubbles through the oil from plant or animal", the dissolved oxygen supply speed thereof can be controlled by, for example, adjusting the pore size of the porous body, flow of a gas containing oxygen and the like. Specifically, when the pore size of the porous body is decreased, the dissolved oxygen supply speed becomes high, and when the flow of a gas containing oxygen is increased, the dissolved oxygen supply speed becomes high.

Examples of the porous body with a pore size of 5 to 1000 μm include spargers and the like. Specifically, for example, a rod filter for gas washing bottle manufactured by CLIMBING Co., Ltd., a screw-cap washing bottle Muenck type middle-sized tube manufactured by SIBATA SCIENTIFIC TECHNOLOGY Ltd., a stainless mesh cartridge filter TMC10DTMS manufactured by ADVANTEC Co., LTD. and the like can be used.

The heating temperature in the heating step is generally 50 to 200° C., preferably 60 to 200° C., more preferably 80 to 200° C., particularly preferably 130 to 180° C. When the heating temperature is less than 50° C., the obtained material for food or drink tends to show a weak effect of imparting an aroma and/or a flavor, which are/is mellow and rich in variety, to a food or drink. On the other hand, when the heating temperature exceeds 200° C., the obtained material for food or drink tends to impart an off-flavor to a food or drink.

The heating method is not particularly limited as long as the heating temperature falls within the aforementioned range, may be any of directly heating and indirect heating and, for example, heating by direct fire, electric heater, vapor, microwave and the like can be mentioned. Stirring during heating is optional. Specific examples of the apparatus used for heating include oil bath, water bath, thermostatic tank, heat block, kneader, Combi Mix, and the like.

While the heating time in the heating step can be appropriately set according to the kind of the oil from plant or animal, heating temperature and the like, it is generally 2 to 24 hours, preferably 4 to 24 hours, more preferably 5 to 7 hours. When the heating time is less than 2 hours, the obtained material for food or drink tends to show a weak effect of imparting an aroma and/or a flavor, which are/is mellow and rich in variety, to a food or drink. On the other hand, when the heating time exceeds 24 hours, the obtained material for food or drink tends to impart an off-flavor to a food or drink.

The oil from plant or animal to be used for the method of the present invention preferably shows a dissolved oxygen concentration not less than a particular concentration before being subjected to the heating step. When an oil from plant or animal having a dissolved oxygen concentration not less than a particular concentration is subjected to the heating step, a material for food or drink, which is capable of imparting an aroma and/or a flavor, which are/is mellow and rich in variety, to a food or drink can be obtained with a short heating time.

Specifically, the dissolved oxygen concentration of an oil from plant or animal before being subjected to the heating step is preferably not less than 6.5 mg/L, more preferably not less than 7.0 mg/L, particularly preferably not less than 8.0 mg/L. While the upper limit of the dissolved oxygen concentration is not particularly limited, it is generally 15 mg/L, preferably 10 mg/L.

The dissolved oxygen concentration of an oil from plant or animal is measured using fluorescence-type oxygen meter Model. FOM-1000 manufactured by Automatic System Research Co. Ltd.

While the method for controlling the dissolved oxygen concentration of an oil from plant or animal before being subjected to the heating step is not particularly limited, for example, the dissolved oxygen concentration of an oil from plant or animal can be controlled by supplying oxygen to the oil from plant or animal by a method similar to the method for supplying oxygen to an oil from plant or animal in the heating step (hereinafter the step for supplying oxygen to an oil from plant or animal before the heating step is to be also referred to as the "acclimation step").

The dissolved oxygen supply speed in the acclimation step is not particularly limited as long as the dissolved oxygen concentration is not less than a particular concentration, and can be appropriately set according to the oxygen supply time and the like. It is generally 0.058 to 100 mg/L/min, preferably 0.08 to 30 mg/L/min.

The oxygen supply time in the acclimation step is not particularly limited as long as the dissolved oxygen concentration is not less than a particular concentration, and can be appropriately set according to the dissolved oxygen supply speed and the like. It is generally 0.5 to 30 hours, preferably 1 to 24 hours.

While the acclimation step may be performed at room temperature (10 to 30° C.), it is preferably performed with heating. When it is performed with heating, the heating temperature is not particularly limited as long as the dissolved oxygen concentration is not less than a particular concentration. It is preferably 35 to 50° C., particularly preferably 40 to 50° C.

An oxidized product obtained by subjecting an oil from plant or animal to the above-mentioned heating step, and an acclimation step when desired, may be directly used, after completion of the heating step, as a material for food or drink, or may be subjected to an appropriate purification treatment and the like, or added with an excipient (e.g., gum arabic, chemically-modified starch, α-cyclodextrin, β-cyclodextrin, γ-cyclodextrin, branched cyclodextrin, soybean polysaccharides, gelatin, dextrin, skimmed milk powder, lactose, oligosaccharides, etc.) and the like, as long as the object of the present invention is not impaired.

A material for food or drink obtained by the method of the present invention (hereinafter to be also referred to simply as "the material of the present invention") can impart an aroma and/or a flavor, which are/is mellow and rich in variety, to a food or drink, as mentioned above, and such material for food or drink has a high content of octanoic acid (CAS number: 124-07-2) and decanoic acid (CAS number: 334-48-5). When the material of the present invention contains an excipient and the like, the term "content" here means a content calculated by removing the weight of the excipient and the like.

Specifically, the content of octanoic acid in the material of the present invention is preferably 5 to 500 weight ppm, more preferably 50 to 450 weight ppm, particularly preferably 150 to 400 weight ppm. When the content of octanoic acid is within the above-mentioned range, the effect of imparting an aroma and/or a flavor, which are/is mellow and rich in variety, to a food or drink is high.

The content of decanoic acid in the material of the present invention is preferably 10 to 4200 weight ppm, more preferably 50 to 1000 weight ppm, particularly preferably 150 to 500 weight ppm. When the content of decanoic acid is within the above-mentioned range, the effect of imparting an aroma and/or a flavor, which are/is mellow and rich in variety, to a food or drink is high.

The material of the present invention further preferably has a high 1-octen-3-ol (CAS number: 3391-86-4, also referred to as "1-octen-3-ol") content. When the content of 1-octen-3-ol in the material of the present invention is high, the effect of imparting an aroma and/or a flavor, which are/is mellow and rich in variety, to a food or drink is high.

Specifically, the content of 1-octen-3-ol in the material of the present invention is preferably 5 to 550 weight ppm, more preferably 50 to 550 weight ppm, particularly preferably 150 to 500 weight ppm.

The contents of octanoic acid, decanoic acid and 1-octen-3-ol in the material of the present invention are measured by gas chromatography.

The material of the present invention preferably satisfies $0 \leq A \leq 80$, $5 \leq B \leq 80$ and $10 \leq C \leq 90$, more preferably $10 \leq A \leq 70$, $10 \leq B \leq 60$ and $10 \leq C \leq 70$, wherein A is the content in parts by weight of 1-octen-3-ol, B is the content in parts by weight of octanoic acid, and C is the content in parts by weight of decanoic acid, and $A+B+C=100$.

While the form of the material of the present invention is not particularly limited, it is, for example, liquid (including oil, slurry and the like), solid (including powder, granular and the like), gel, paste and the like.

Examples of the food and drink to be added with the material of the present invention include, but are not limited to, a seasoning; soup; processed food obtained by processing meat, chicken, seafood and the like; a seasoned powder for sprinkling over rice; instant food; snack food; canned food; milk and dairy product; and emulsion food and the like, and the material of the present invention can also be added to other broad range of foods. More specific examples include Western cooking such as beef consomme soup, curry, beef stew, hamburger, steak and the like; Chinese cooking such as Chinese soup, jiaozi, shaomai, Chinese fried rice, deep-fried chicken and the like; Japanese cooking such as simmered meat and potatoes, boiled chicken and vegetables and the like; various seasonings such as Worcester sauce, demiglace sauce, ketchup, various sauces (e.g., sesame sauce etc.) and the like; cooked rices such as rice ball, pilaf and the like; milk and dairy product such as raw milk, cows milk, special milk, raw goat milk, sterilized goat milk, raw sheep milk, composition-adjusted milk, low-fat milk, non-fat milk, processed milk, cream, fresh cream, butter, butter oil, cheese (e.g., natural cheese, processed cheese, cottage cheese, etc.), condensed whey, ice creams (e.g., ice cream, ice milk, lactic ice, etc.), condensed milk, condensed skim milk, evaporated milk, evaporated skim milk, sweetened condensed milk, sweetened condensed skim milk, powdered whole milk, skimmed milk powder, cream powder, whey powder, protein condensed whey powder, butter milk powder, sweetened milk powder, formulated milk powder, fermented milk, lactic acid bacteria drinks, milk drinks, white sauce, yogurt, coconut milk, soymilk, Thai chicken curry, milk stew, corn soup, coffee with milk, custard cream and the like; dressing such as sesame dressing and Caesar dressing and the like; margarine, mayonnaise and the like.

The present invention also provides a production method of a food or drink, which comprises adding the material of the present invention to a food or drink to impart an aroma and/or a flavor to the food or drink (hereinafter to be also referred to simply as "the production method of a food or drink of the present invention").

The production method of a food or drink of the present invention can impart an aroma and/or a flavor, which are/is mellow and rich in variety, to a food or drink by adding the material of the present invention to the food or drink. As used herein, the "aroma and/or flavor rich in variety" refers to an aroma and/or flavor superior in the mildness, fullness, mild sense, rich sense and mature sense.

The food or drink of the present invention can be produced by using starting materials similar to those of known foods and drinks and by a method similar to the production methods of known foods and drinks, except that a step of adding the material of the present invention to a food or drink is included.

The timing of the addition of the material of the present invention to a food or drink is not particularly limited and, for example, the material may be added, together with other starting materials, during production, cooking and the like of a food or drink, or after completion of a food or drink, or immediately before and/or during eating or drinking a food or drink.

Specific examples of the food or drink produced by the production method of the food or drink of the present invention include those similar to the examples of the above-mentioned foods and drinks to which the material of the present invention is added.

Other features of the invention will become apparent in the course of the following descriptions of exemplary embodiments which are given for illustration of the invention and are not intended to be limiting thereof.

EXAMPLES

The measurement of the contents of 1-octen-3-ol, octanoic acid and decanoic acid, and sensory evaluation of the samples prepared in the following Examples 1-5 were performed as follows.

(1) Measurement Method of Contents of 1-octen-3-ol, Octanoic Acid and Decanoic Acid.

Gas chromatography (GC) was used for the measurement.
Analysis Instrument.
  GC; HewlettPackard 5890 Series II
  detector; FID (hydrogen flame ionization detector)
Analysis Pre-Treatment.
  Sample (0.5 g) was dissolved in diethyl ether (10 mL).
Analysis Conditions.
  injection volume; Direct method, 1 μL
  injection inlet; 250° C.
  split ratio; 1:10
  column; HP-FFAP manufactured by Agilent ϕ 0.32 mm×25 m, membrane thickness 0.52 μm
  column temperature; 65° C. (0 min)→10° C./min temperature rise→240° C. (25 min)
  gas flow; helium (carrier gas) 2.0 mL/min;
  helium (make-up gas) 30 mL/min
  gas pressure; hydrogen 40 mL/min, air 400 mL/min
  detector; FID 250° C.

(2) Sensory Evaluation.

A 1.5 wt % aqueous solution of commercially available chicken flavor seasoning (manufactured by Ajinomoto Co., Inc., trade name: "AJINOMOTO KK MARUTORIGARA SOUP") was prepared, a sample was added to the aqueous solution at a concentration of 8 weight ppm, and three professional panelists conducted sensory evaluation of the favorability of the aroma and flavor which are mellow and rich in variety. For the sensory evaluation, a 1.5 wt % aqueous solution of the above-mentioned commercially available chicken flavor seasoning free of sample was used as a control, and marked out of 10 points wherein the control was 5 points. As the score, the average of the points of the professional panelists was calculated.

Method for Measurement of Dissolved Oxygen Supply Speed.

The dissolved oxygen supply speed in preparation of samples of Examples 1-5 was measured using fluorescence-type oxygen meter Model. FOM-1000 manufactured by Automatic System Research Co. Ltd. at 25° C. and according to the following (1)-(3).

(1) A fluorescence-type oxygen meter was powered on and allowed to stand for 10 minutes in the air for stabilization.

(2) Calibration was performed in the air.

(3) A sensor was inserted obliquely into a sample and fixed, the dissolved oxygen concentration is measured when the numerical value becomes stable, and the dissolved oxygen supply speed is calculated by the formula mentioned below.

dissolved oxygen supply speed=variation in concentration of dissolved oxygen in sample/time of oxygen supply to sample

Example 1

Study of Presence or Absence of Acclimation Step (1) Preparation of Sample not Subjected to Acclimation Step (Sample 1-1)

Chicken fat was heated at 130° C. for 5 hours or 7 hours while supplying the air thereto at a dissolved oxygen supply speed of 1.0 mg/L/min to give sample 1-1. The air was supplied to the chicken fat by passing the air through a rod filter for gas washing bottle (pore size: 40 to 50 μm) manufactured by CLIMBING Co., Ltd. at a flow of 1 L/min per 100 g chicken fat to give microscopic bubbles, and passing the bubbles through the chicken fat.

(2) Preparation of Sample Subjected to Acclimation Step (Sample 1-2)

Chicken fat was heated at 50° C. for 1 hour while supplying the air thereto at a dissolved oxygen supply speed of 1.0 mg/L/min. Thereafter, the obtained chicken fat was heated at 130° C. for 5 hours or 7 hours while supplying the air thereto at a dissolved oxygen supply speed of 1.0 mg/L/min to give sample 1-2. The air was supplied to the chicken fat by passing the air through a rod filter for gas washing bottle (pore size: 40 to 50 μm) manufactured by CLIMBING Co., Ltd. at a flow of 1 L/min per 100 g chicken fat to give microscopic bubbles, and passing the bubbles through the chicken fat.

The dissolved oxygen concentration of the chicken fat before heating the chicken fat at 50° C. for 1 hour while supplying the air at the dissolved oxygen supply speed of 1.0 mg/L/min (dissolved oxygen concentration before acclimation step), and the dissolved oxygen concentration of the chicken fat after heating at 50° C. for 1 hour while supplying the air at the dissolved oxygen supply speed of 1.0 mg/L/min (dissolved oxygen concentration after acclimation step) are as shown in the following Table 1.

TABLE 1

| dissolved oxygen concentration before acclimation step | dissolved oxygen concentration after acclimation step |
| --- | --- |
| 3.52 mg/L | 8.87 mg/L |

The dissolved oxygen concentration of the chicken fat was measured using fluorescence-type oxygen meter Model. FOM-1000 manufactured by Automatic System Research Co., Ltd.

The contents of 1-octen-3-ol, octanoic acid and decanoic acid in sample 1-1 and sample 1-2 were measured, and the sensory evaluation thereof was performed. The measurement results of the contents of 1-octen-3-ol, octanoic acid and decanoic acid are shown in the following Tables 2 and 3, and the results of the sensory evaluation are shown in the following Table 4.

TABLE 2

After heating for 5 hours (unit: weight ppm).

| sample No. | 1-octen-3-ol | octanoic acid | decanoic acid |
| --- | --- | --- | --- |
| 1-1 | 88 | 135 | 131 |
| 1-2 | 314 | 182 | 228 |

TABLE 3

After heating for 7 hours (unit: weight ppm).

| sample No. | 1-octen-3-ol | octanoic acid | decanoic acid |
| --- | --- | --- | --- |
| 1-1 | 130 | 102 | 148 |
| 1-2 | 231 | 234 | 318 |

TABLE 4

| | heating time in heating step | |
| --- | --- | --- |
| sample No. | 5 hours | 7 hours |
| 1-1 | 6.7 | 7.3 |
| 1-2 | 8.3 | 8.3 |

As is clear from the results shown in Tables 2-4, the sample (sample 1-2) subjected to the acclimation step showed higher contents of 1-octen-3-ol, octanoic acid and decanoic acid and better sensory evaluation as compared to the sample not subjected to the acclimation step (sample 1-1), and was confirmed to be more preferable.

Particularly, by comparison of the results of sample 1-1 heated for 7 hours and those of sample 1-2 heated for 5 hours, the latter showed higher contents of 1-octen-3-ol, octanoic acid and decanoic acid and better sensory evaluation as compared to the former even though the total time required for preparation was 1 hr shorter than for the former.

Example 2

Study of Dissolved Oxygen Supply Speed

Preparation of Sample 2-1-Sample 2-8

Chicken fat was heated at 50° C. for 1 hour while supplying the air thereto at a dissolved oxygen supply speed (measured at 25° C.) shown in the following Table 5, and heated at 130° C. for 5 hours while supplying the air thereto at the same dissolved oxygen supply speed to give samples 2-1 to 2-8. The air was supplied to the chicken fat by passing the air through a sparger (rod filter for gas washing bottle manufactured by CLIMBING Co., Ltd., screw-cap washing bottle Muenck type middle-sized tube manufactured by SIBATA SCIENTIFIC TECHNOLOGY Ltd., or stainless mesh cartridge filter TMC10DTMS manufactured by ADVANTEC Co., LTD.) to give microscopic bubbles, and passing the bubbles through the chicken fat. The dissolved oxygen supply speed was controlled by appropriately adjusting the pore size of the sparger to 10 to 1000 μm, and appropriately adjusting the air flow to 0.01 to 10 L/min per 100 g chicken fat.

TABLE 5

| sample No. | dissolved oxygen supply speed (mg/L/min) | air flow (L/min) | pore size (μm) of sparger |
|---|---|---|---|
| 2-1 | 0 | | no oxygen supply |
| 2-2 | 0.045 | 0.01 | 1000 |
| 2-3 | 0.058 | 0.1 | 1000 |
| 2-4 | 0.1 | 0.1 | 40-50 |
| 2-5 | 0.69 | 0.5 | 40-50 |
| 2-6 | 1.02 | 1 | 40-50 |
| 2-7 | 1.98 | 10 | 40-50 |
| 2-8 | 4.75 | 0.5 | 10 |

Samples 2-3 to 2-5 and 2-7 were measured for the dissolved oxygen concentration after an acclimation step (that is, after heating chicken fat at 50° C. for 1 hour while supplying the air thereto at a dissolved oxygen supply speed shown in the above-mentioned Table 5). For the measurement, fluorescence-type oxygen meter Model. FOM-1000 manufactured by Automatic System Research Co., Ltd. was used. The results are shown in Table 6.

TABLE 6

| sample No. | dissolved oxygen supply speed (mg/L/min) | dissolved oxygen concentration (mg/L) after acclimation step |
|---|---|---|
| 2-3 | 0.058 | 6.79 |
| 2-4 | 0.1 | 6.79 |
| 2-5 | 0.69 | 8.21 |
| 2-7 | 1.98 | 8.30 |

The contents of 1-octen-3-ol, octanoic acid and decanoic acid in samples 2-1 to 2-8 were measured, and the sensory evaluation thereof was performed. The measurement results of the contents of 1-octen-3-ol, octanoic acid and decanoic acid are shown in the following Table 7, and the results of the sensory evaluation are shown in the following Table 8.

TABLE 7

(unit: weight ppm).

| sample No. | 1-octen-3-ol | octanoic acid | decanoic acid |
|---|---|---|---|
| 2-1 | 0 | 0 | 0 |
| 2-2 | 0 | 0 | 0 |
| 2-3 | 0 | 25 | 42 |
| 2-4 | 34 | 88 | 53 |
| 2-5 | 56 | 111 | 69 |
| 2-6 | 314 | 182 | 228 |
| 2-7 | 526 | 228 | 353 |
| 2-8 | 497 | 314 | 227 |

TABLE 8

| sample No. | score |
|---|---|
| 2-1 | 5.0 |
| 2-2 | 5.0 |
| 2-3 | 5.3 |
| 2-4 | 6.2 |
| 2-5 | 7.0 |
| 2-6 | 8.3 |
| 2-7 | 8.8 |
| 2-8 | 8.3 |

As is clear from the results shown in Tables 7 and 8, it was confirmed that the dissolved oxygen supply speed is preferably 0.058 to 4.75 mg/L/min (sample 2-3-sample 2-8). Particularly, the dissolved oxygen supply speed of not less than 0.1 mg/L/min (sample 2-4-sample 2-8) was preferable, and the dissolved oxygen supply speed of not less than 1.02 mg/L/min (sample 2-6-sample 2-8) was more preferable.

In addition, as shown in Table 6, the concentration of the dissolved oxygen after the acclimation step was 6.79 mg/L at the lowest.

Example 3

Study of Heating Time in Heating Step

Preparation of Sample 3-1-Sample 3-7

Chicken fat was heated at 50° C. for 1 hour while supplying the air thereto at a dissolved oxygen supply speed of 1.0 mg/L/min, and heated at 130° C. for a time shown in the following Table 9 while supplying the air thereto at the same dissolved oxygen supply speed to give samples 3-1 to 3-7. The air was supplied to the chicken fat by passing the air through a rod filter for gas washing bottle (pore size: 40 to 50 μm) manufactured by CLIMBING Co., Ltd. at a flow of 1 L/min per 100 g chicken fat to give microscopic bubbles, and passing the bubbles through the chicken fat.

TABLE 9

| sample No. | heating time in heating step |
|---|---|
| 3-1 | 0 hours |
| 3-2 | 2 hours |
| 3-3 | 4 hours |
| 3-4 | 5 hours |
| 3-5 | 6 hours |
| 3-6 | 7 hours |
| 3-7 | 24 hours |

The contents of 1-octen-3-ol, octanoic acid and decanoic acid in sample 3-1 to sample 3-7 were measured, and the sensory evaluation thereof was performed. The measurement results of the contents of 1-octen-3-ol, octanoic acid and decanoic acid are shown in the following Table 10, and the results of the sensory evaluation are shown in the following Table 11.

TABLE 10

(unit: weight ppm).

| sample No. | 1-octen-3-ol | octanoic acid | decanoic acid |
|---|---|---|---|
| 3-1 | 0 | 0 | 0 |
| 3-2 | 0 | 172 | 63 |
| 3-3 | 95 | 135 | 125 |
| 3-4 | 314 | 182 | 228 |
| 3-5 | 215 | 177 | 237 |
| 3-6 | 231 | 234 | 318 |
| 3-7 | 32 | 365 | 410 |

TABLE 11

| sample No. | score |
|---|---|
| 3-1 | 5.0 |
| 3-2 | 6.3 |
| 3-3 | 7.3 |
| 3-4 | 8.3 |
| 3-5 | 8.3 |
| 3-6 | 8.3 |
| 3-7 | 7.5 |

As is clear from the results shown in Tables 10 and 11, was confirmed that the heating time in the heating step was preferably 2 to 24 hours (sample 3-2-sample 3-7).

Particularly, the heating time was preferably 4-24 hours (sample 3-3-sample 3-7), more preferably 5-7 hours (sample 3-4-sample 3-6).

Example 4

Study of Heating Temperature in Heating Step

Preparation of Sample 4-1-Sample 4-5

Chicken fat was heated at 50° C. for 1 hour while supplying the air thereto at a dissolved oxygen supply speed of 1.0 mg/L/min, and heated at a temperature shown in the following Table 12 for 5 hours while supplying the air thereto at the same dissolved oxygen supply speed to give sample 4-1 to sample 4-5. The air was supplied to the chicken fat by passing the air through a rod filter for gas washing bottle (pore size: 40 to 50 μm) manufactured by CLIMBING Co., Ltd. at a flow of 1 L/min per 100 g chicken fat to give microscopic bubbles, and passing the bubbles through the chicken fat.

TABLE 12

| sample No. | heating temperature in heating step |
| --- | --- |
| 4-1 | 50° C. |
| 4-2 | 80° C. |
| 4-3 | 130° C. |
| 4-4 | 180° C. |
| 4-5 | 200° C. |

The contents of 1-octen-3-ol, octanoic acid and decanoic acid in sample 4-1 to sample 4-5 were measured, and the sensory evaluation thereof was performed. The measurement results of the contents of 1-octen-3-ol, octanoic acid and decanoic acid are shown in the following Table 13, and the results of the sensory evaluation are shown in the following Table 14.

TABLE 13

| (unit: weight ppm). | | | |
| --- | --- | --- | --- |
| sample No. | 1-octen-3-ol | octanoic acid | decanoic acid |
| 4-1 | 0 | 21 | 60 |
| 4-2 | 51 | 33 | 80 |
| 4-3 | 314 | 182 | 228 |
| 4-4 | 216 | 237 | 160 |
| 4-5 | 101 | 296 | 174 |

TABLE 14

| sample No. | score |
| --- | --- |
| 4-1 | 6.3 |
| 4-2 | 7.5 |
| 4-3 | 8.3 |
| 4-4 | 7.8 |
| 4-5 | 6.8 |

As is clear from the results shown in Tables 13 and 14, it was confirmed that the heating temperature in the heating step was preferably 50 to 200° C. (sample 4-1-sample 4-5). Particularly, the heating temperature of 80 to 200° C. (sample 4-2-sample 4-5) was preferable, 130 to 180° C. (sample 4-3 and sample 4-4) was more preferable.

Example 5

Study of the Kind of Oil from Plant or Animal

Preparation of Sample 5-1-Sample 5-9

Oil from plant or animal shown in the following Table 15 was heated at 50° C. for 1 hour while supplying the air thereto at a dissolved oxygen supply speed of 1.0 mg/L/min, and heated at 130° C. for 7 hours while supplying the air thereto at the same dissolved oxygen supply speed to give samples 5-1 to 5-9. The air was supplied to each oil from plant or animal by passing the air through a rod filter for gas washing bottle (pore size: 40 to 50 μm) manufactured by CLIMBING Co., Ltd. at a flow of 1 L/min per 100 g oil from plant or animal to give microscopic bubbles, and passing the bubbles through the oil from plant or animal.

TABLE 15

| sample No. | kind of oil from plant or animal |
| --- | --- |
| 5-1 | chicken fat |
| 5-2 | rape seed oil |
| 5-3 | coconut oil |
| 5-4 | soybean oil |
| 5-5 | corn oil |
| 5-6 | perilla oil |
| 5-7 | fish oil (tuna oil) |
| 5-8 | lard |
| 5-9 | beef fat |

Samples 5-1 to 5-7 were measured for the dissolved oxygen concentration before an acclimation step (that is, before heating the oil from plant or animal at 50° C. for 1 hour while supplying the air thereto at a dissolved oxygen supply speed shown of 1.0 mg/L/min). For the measurement, fluorescence-type oxygen meter Model. FOM-1000 manufactured by Automatic System Research Co., Ltd. was used. The results are shown in Table 16.

TABLE 16

| sample No. | kind of oil from plant or animal | dissolved oxygen concentration (mg/L) before acclimation step |
| --- | --- | --- |
| 5-1 | chicken fat | 3.52 |
| 5-2 | rape seed oil | 6.12 |
| 5-3 | coconut oil | 5.55 |
| 5-4 | soybean oil | 5.74 |
| 5-5 | corn oil | 4.31 |
| 5-6 | perilla oil | 4.60 |
| 5-7 | fish oil (tuna oil) | 4.11 |

The contents of 1-octen-3-ol, octanoic acid and decanoic acid in sample 5-1 to sample 5-9 were measured, and the sensory evaluation thereof was performed. The measurement results of the contents of 1-octen-3-ol, octanoic acid and decanoic acid are shown in the following Table 17, and the results of the sensory evaluation are shown in the following Table 18.

TABLE 17

(unit: weight ppm).

| sample No. | 1-octen-3-ol | octanoic acid | decanoic acid |
|---|---|---|---|
| 5-1 | 231 | 234 | 318 |
| 5-2 | 232 | 493 | 148 |
| 5-3 | 10 | 12 | 12 |
| 5-4 | 241 | 420 | 4145 |
| 5-5 | 235 | 218 | 168 |
| 5-6 | 21 | 62 | 34 |
| 5-7 | 81 | 16 | 19 |
| 5-8 | 165 | 27 | 110 |
| 5-9 | 10 | 8 | 36 |

TABLE 18

| sample No. | score |
|---|---|
| 5-1 | 8.3 |
| 5-2 | 7.2 |
| 5-3 | 6.7 |
| 5-4 | 7.5 |
| 5-5 | 7.2 |
| 5-6 | 6.8 |
| 5-7 | 6.7 |
| 5-8 | 7.8 |
| 5-9 | 7.5 |

As is clear from the results shown in Tables 17 and 18, the obtained materials for food or drink showed higher contents of 1-octen-3-ol, octanoic acid and decanoic acid, and better sensory evaluation by using any oil from plant or animal.

As shown in Table 16, moreover, the concentration of the dissolved oxygen before the acclimation step was 6.12 mg/L at the highest.

INDUSTRIAL APPLICABILITY

According to the present invention, a convenient production method of a material for food or drink, which is capable of imparting an aroma and/or a flavor, which are/is mellow and rich in variety, to a food or drink, can be provided.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of producing a material for food or drink, which comprises:
   acclimating a starting oil from a plant or animal by supplying oxygen to said starting oil at a rate of 0.058 to 100 mg/L/min; and then
   heating said oil from a plant or animal while supplying oxygen at a dissolved oxygen supply speed of not less than 0.058 mg/L/min to said oil from a plant or animal, to obtain a treated oil which contains at least one compound selected from the group consisting of 5 to 500 weight ppm octanoic acid, 5 to 550 weight ppm 1-octen-3-ol, and 10 to 4200 weight ppm decanoic acid.

2. The method according to claim 1, wherein said dissolved oxygen supply speed is not less than 0.1 mg/L/min.

3. The method according to claim 1, wherein said dissolved oxygen supply speed is not less than 1.0 mg/L/min.

4. The method according to claim 1, wherein said oil from a plant or animal is heated to a temperature of 50 to 200° C.

5. The method according to claim 2, wherein said oil from a plant or animal is heated to a temperature of 50 to 200° C.

6. The method according to claim 3, wherein said oil from a plant or animal is heated to a temperature of 50 to 200° C.

7. The method according to claim 1, wherein said oil from a plant or animal is heated for a time of 2 to 24 hours.

8. The method according to claim 2, wherein said oil from a plant or animal is heated for a time of 2 to 24 hours.

9. The method according to claim 3, wherein said oil from a plant or animal is heated for a time of 2 to 24 hours.

10. The method according to claim 4, wherein said oil from a plant or animal is heated for a time of 2 to 24 hours.

11. The method according to claim 1, wherein said oil from a plant or animal has a dissolved oxygen concentration of not less than 6.5 mg/L before said heating.

12. The method according to claim 1, wherein said oil from a plant or animal is an animal fat or oil.

13. A method of producing a food or drink, comprising:
   (A) acclimating a starting oil from a plant or animal by supplying oxygen to said starting oil at a rate of 0.058 to 100 mg/L/min,
   (B) heating said oil from a plant or animal while supplying oxygen at a dissolved oxygen supply speed of not less than 0.058 mg/L/min to said oil from a plant or animal, to obtain a treated oil which contains at least one compound selected from the group consisting of 5 to 500 weight ppm octanoic acid, 5 to 550 weight ppm 1-octen-3-ol, and 10 to 4200 weight ppm decanoic acid; and
   (C) adding said treated oil to a food or drink to impart an aroma and/or a flavor to the food or drink.

14. The method of claim 1, wherein said acclimating comprises supplying oxygen to said starting oil prior to said heating at a rate of 0.08 to 30 mg/L/min.

15. The method of claim 1, wherein said acclimating comprises supplying oxygen to said starting oil prior to said heating for a time of 0.5 to 30 hours.

16. The method of claim 1, wherein said acclimating comprises supplying oxygen to said starting oil prior to said heating for a time of 1 to 24 hours.

17. The method of claim 1, wherein said acclimating comprises supplying oxygen to said starting oil at a temperature of 10 to 30° C., prior to said heating.

18. The method of claim 1, wherein said acclimating comprises supplying oxygen to said starting oil at a temperature of 35 to 50° C., prior to said heating.

19. The method of claim 1, wherein said acclimating comprises supplying oxygen to said starting oil at a temperature of 40 to 50° C., prior to said heating.

20. The method of claim 1, wherein said acclimating comprises supplying oxygen to said starting oil at a rate of 0.058 to 100 mg/L/min, for a time of 0.5 to 30 hours, at a temperature of 35 to 50° C., prior to said heating.

21. The method of claim 1, wherein said acclimating comprises supplying oxygen to said starting oil at a rate of 0.08 to 30 mg/L/min, for a time of 1 to 24 hours, at a temperature of 40 to 50° C., prior to said heating.

22. The method of claim 1, wherein said starting oil is chicken fat.

23. The method of claim 1, wherein said starting oil is rapeseed oil.

\* \* \* \* \*